(No Model.)

C. W. PALMER.
GLASS SLIDE FOR MICROSCOPES.

No. 336,257. Patented Feb. 16, 1886.

Witnesses:
Frank H. Pierpont.
F. H. Richards.

Inventor:
Charles W. Palmer
By C. O. Palmer Atty.

UNITED STATES PATENT OFFICE.

CHARLES W. PALMER, OF CLEVELAND, OHIO.

GLASS SLIDE FOR MICROSCOPES.

SPECIFICATION forming part of Letters Patent No. 336,257, dated February 16, 1886.

Application filed June 8, 1885. Serial No. 167,991. (No model.)

*To all whom it may concern:*

Be it known that I, CHARLES W. PALMER, of Cleveland, in the county of Cuyahoga and State of Ohio, have invented certain new and useful Improvements in Slide-Glasses for Microscopes; and I do hereby declare the following to be a full, clear, and exact description of the invention, such as will enable others skilled in the art to which it pertains to make and use the same.

This invention relates to glass slides for microscopes, the object being to obtain a very oblique illumination, as well as to provide a slide more convenient to handle and having a neater appearance.

To this end my invention consists in the novel features and improvements hereinafter described and claimed.

My improved slides are adapted to enter between the clips and stage of the microscope much more easily than the old form, and do not cut into the under surface of the clips, as the others frequently do. When the stage is provided with two sliding ledges, as is generally the case with the larger instruments, this slide is held much more firmly than the plain ones. When the mounted objects are kept in rack-boxes, as is frequently done, more can be accommodated on account of the thinness of their edges.

My improved slides have this great advantage over those now in use. They may be used to take the place of the hemispherical lens, the Woodward prism, or the Wenham reflex illuminator, all of which will be hereinafter more fully set forth and explained.

Figure 1:
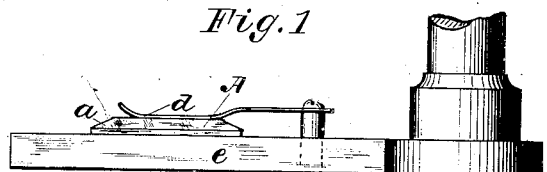
Figure 9:
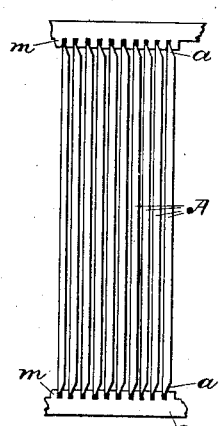
Figure 10:
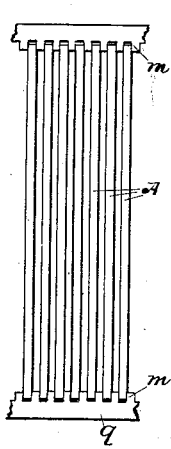
Figure 2:
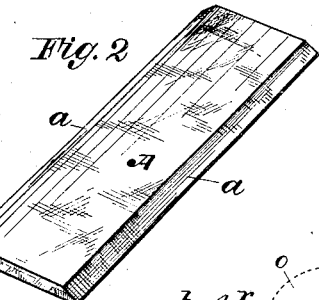
Figure 3:
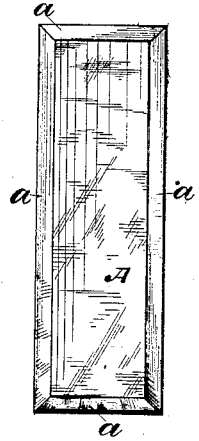
Figure 4:
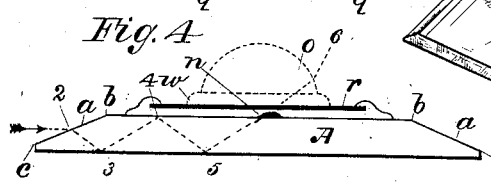
Figure 5:
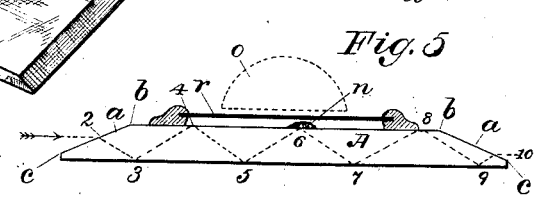
Figure 6:
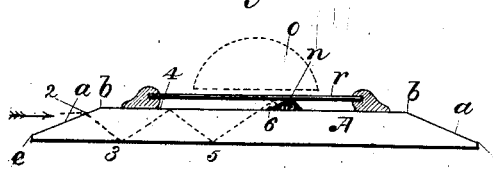
Figure 7:
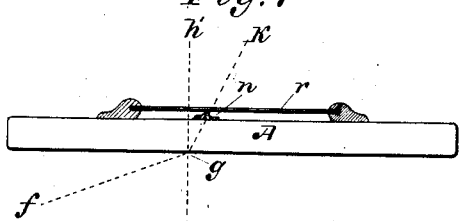
Figure 8:
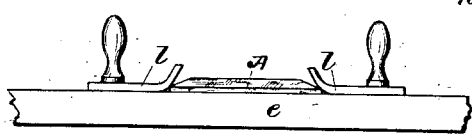

Figure 1 is a view in elevation of a portion of a microscope having my slide in place between the stage and clips. Fig. 2 is a view in perspective of a slide constructed according to my invention, showing the same with two opposite edges beveled. Fig. 3 is a plan view showing a slide with four edges beveled. Fig. 4 is a section taken through the center of a beveled slide having a balsam or fluid mounted object thereon, and shows the course of the light when viewed through an immersion objective. Fig. 5 is a section taken through the center of a beveled slide having a dry-mounted object thereon, and showing the course of the light when viewed through either a dry front or an immersion objective. Fig. 6 is a section taken through the center of a beveled slide having a balsam or fluid mounted object thereon, and shows the course of the light viewed through a dry front objective. Fig. 7 illustrates the course taken by a ray of light in ordinary oblique illumination. Fig. 8 shows my slide as held in place on the microscope-stage by ledges. Fig. 9 shows my slide in a slide-rack. Fig. 10 shows the ordinary slide in a slide-rack.

A represents a glass slide, preferably of plate-glass.

$a\ a$ represent the beveled edges, which are formed on the slide from a point, $b$, on the upper surface to a point, $c$, at or near the edge of the under face. As will be seen, this forms an edge which is wedge-shaped, and hence adapted to enter easily beneath the clip $d$ of a microscope, or, in case the stage $e$ is provided with ledges $l$, as shown in Fig. 8, it fits more closely the contour of the ledges. The cleats $m$ of a rack, $q$, (which are usually of wood, as metal might scratch the glass,) are made wide enough to secure the requisite strength to prevent being knocked off. Now, as I have a thinner edge, the cleat may be placed closer, and thus accommodate a larger number of slides in a given-sized case, as illustrated in Figs. 9 and 10.

Many objects, especially the more transparent ones, are best seen by oblique illumination, and especially by black-ground illumination. Black-ground illumination is produced when the rays of light are directed with such obliquity as not to be received into the object-glass at all, but are sufficiently retained by the object to make it appear "self-luminous," as it is sometimes expressed. The requisite obliquity for narrow-angled objectives is obtained by turning the concave mirror as far as possible from the axis of the microscope; but wide-angled objectives require a greater obliquity of illumination than can thus be obtained.

The method of illumination about to be described is essentially very oblique, and is especially advantageous for use with high-power objectives and for producing black-ground illumination.

Fig. 7 illustrates oblique illumination as produced by turning the mirror from the axis of the instrument. An oblique ray of light, $f$, entering the glass at $g$, is refracted in the direction $g$ K, so that the angle $f g h$ is always greater than the angle $h' g$ K, the angle $h' g$ K being at its maximum when the angle $f g h$ is infinitely close to ninety degrees, in which case the angle $h' g$ K is about forty-one degrees for ordinary crown-glass, but varies somewhat with the glass. Without some special appliance, as Wenham's reflex illuminator, this forty-one degrees is the greatest obliquity at which the light can strike the object (which is mounted above the glass) of the ordinary slide with parallel faces. To increase this obliquity we must incline the surface where the light enters to the surface upon which the object is mounted. This has heretofore been accomplished by bringing a separate piece of glass of various shapes into immersion-contact with the surface of the slide by a film of water or glycerine, or some more refractive oil, or by cementing the said glass on the slide with balsam, the liquid or cement making them serve optically as one piece of glass. Among these devices are the Woodward prism, hemispherical lens, Wenham's reflex illuminator, &c., which are well known to microscopists. I accomplish this result, however, by inclining a portion of the surface of the slide itself, and not by using a separate piece of glass, as those before me have done; and I prefer the edge of the slide as the most desirable place for said inclination, which I accomplish by beveling the edge, substantially as shown. The optical function of this beveled edge is illustrated in Figs. 4, 5, and 6, in which $r$ is the cover-glass, $o$ the object-glass, and $w$ the immersion-fluid.

Fig. 4 shows the path taken by a ray of light with a balsam or fluid mounted object and an immersion objective. The ray of light $f$ from a bull's-eye or condenser or a concave mirror, after entering the beveled edge at 2, is refracted downward to the surface of the slide at 3, and making an angle with its perpendicular greater than the critical angle is totally reflected to the upper surface at 4; and as the upper and lower surfaces are parallel it makes with the upper surface at 4 the same angle that it did with the lower surface at 3, because the angle of incidence at 3 is equal to the angle of reflection at 3; and as the same reasoning answers at 5 as at 4 the ray takes the course indicated by the dotted lines 2 3 4 5, from which point it passes up through the object, cover-glass, and immersion-liquid into the front lens of the objective, the course of the ray depending on the refractive power of the media through which it passes and the angle of incidence with their surface.

Fig. 5 shows the same method of illumination with a dry-mounted object. The light from the condenser entering the bevel at 2 is refracted in the direction 2 3, and striking the lower surface at 3, beyond the critical angle, is totally reflected, and excepting where the light strikes the object it continues to be reflected within the glass from one surface to the other, as indicated by the dotted lines 3 4 5 6 7 8 9 10, through the slide and out at the opposite edge. When, however, the light strikes the object which is in contact with the slide near point 6, it passes up through the object, which then presents the appearance of a self-luminous body, and produces the beautiful effect of black-ground illumination, similar to that obtained by Wenham's reflex illuminator. With objects mounted in balsam or fluid the same difficulty occurs in securing very oblique illumination from above through the cover-glass as from below through the slide. This illumination from above may be secured, however, by illuminating the balsam mount through the beveled edge and viewing the object through a dry front objective. This is illustrated in Fig. 6. The light entering the bevel at 2 takes the course indicated by the dotted lines 2 3 4 5, from which it passes upward to the upper surface of the cover-glass at point 6 and is reflected downward upon the surface of the object. The rays which do not strike the object pass on through the slide to the opposite edge, and thus give the object a bright illumination on a dark field.

In the case of Wenham's reflex illuminator the object is illuminated from every azimuth by rotating the illuminator or rotating the stage; but in the case of illumination through a beveled-edge slide the light from one edge can strike the object obliquely only from the direction of that edge; consequently to be able to illuminate in the direction of each of the edges we must bevel all of those edges. To eliminate the shadows the light is taken from two opposite directions at once, which could only be done by beveling the opposite edges, as shown in Fig. 2. Thus we see that the advantages of this beveled edge are secured to their fullest extent only by beveling all sides, which I prefer to do. The explanation of the illumination from the side bevels answers equally well for the end bevels, the only difference being a decrease in the intensity of illumination, owing to the increased distance that the light has to travel in the glass before reaching the object. The intensity of the illumination will of course depend on the intensity of the source of light, amount of concentration produced by the lens or mirror on the transparency of the beveled surface, and the transparency of the media through which the light passes. The objects to be examined in this way will receive more intense illumination if mounted under small covers and circled with narrow rings, or even if not circled at all, as the ring absorbs part of the light wherever the ray strikes the surface of the glass directly beneath it.

The kinds of mounting referred to in this specification need no description here, as they are well known to microscopists.

The obliquity of illumination may be varied by varying the angle of incidence of the ray of light with the surface of the glass, or by varying the angle of bevel of the edge.

I do not claim, broadly, glass having a beveled edge, as that has been done before. Neither do I confine myself to a polished bevel; but What I do claim, and wish to secure by Letters Patent, is—

1. A glass slide for microscopes, having its opposite side edges beveled, substantially as described, for the purpose set forth.

2. As a new article of manufacture, a slide for microscopes, made of glass and provided with beveled ends and sides, substantially as set forth.

In testimony whereof I sign this specification, in the presence of two witnesses, this 29th day of May, 1885.

CHARLES W. PALMER.

Witnesses:
ALBERT E. LYNCH,
EDWARD W. PALMER, Jr.